(12) United States Patent
Choi et al.

(10) Patent No.: US 9,742,107 B2
(45) Date of Patent: Aug. 22, 2017

(54) CONNECTOR MODULE AND LOCKING DEVICE INCLUDING THE SAME

(71) Applicant: Samsung Electronics Co., Ltd., Gyeonggi-do (KR)

(72) Inventors: Sang Wook Choi, Gyeonggi-do (KR); Kyung Ho Kim, Gyeonggi-do (KR); Sung Yub Kim, Seoul (KR); Han Eol Park, Seoul (KR); Jeong In Lee, Gyeonggi-do (KR); Jae Young Chang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/047,069

(22) Filed: Feb. 18, 2016

(65) Prior Publication Data
US 2016/0254613 A1    Sep. 1, 2016

(30) Foreign Application Priority Data

Feb. 27, 2015 (KR) .......................... 10-2015-0028653

(51) Int. Cl.
| | | |
|---|---|---|
| *H01R 39/00* | (2006.01) | |
| *H01R 13/58* | (2006.01) | |
| *G06F 1/16* | (2006.01) | |
| *H01R 13/631* | (2006.01) | |
| *H01R 31/06* | (2006.01) | |
| *H04M 1/04* | (2006.01) | |

(52) U.S. Cl.
CPC ....... *H01R 13/5829* (2013.01); *G06F 1/1632* (2013.01); *H01R 13/6315* (2013.01); *H01R 31/065* (2013.01); *H04M 1/04* (2013.01); *H01R 13/58* (2013.01)

(58) Field of Classification Search
CPC  H01R 13/5829; H01R 13/6315; H01R 13/58; H01R 31/065; G06F 1/1632; G06F 1/16; H04M 1/04
USPC ............................................ 439/31
See application file for complete search history.

(56) References Cited

U.S. PATENT DOCUMENTS

| | | | |
|---|---|---|---|
| 6,193,546 B1 * | 2/2001 | Sadler ....................... | A45F 5/02 439/165 |
| 7,014,486 B1 | 3/2006 | Wu et al. | |
| (Continued) | | | |

FOREIGN PATENT DOCUMENTS

| | | |
|---|---|---|
| EP | 2 264 853 A2 | 12/2010 |
| EP | 2 629 172 A2 | 8/2013 |

OTHER PUBLICATIONS

European Search Report, dated May 31, 2016.

*Primary Examiner* — Jean F Duverne
(74) *Attorney, Agent, or Firm* — Cha & Reiter, LLC

(57) ABSTRACT

A connector module may include: a connector body including an interior space with an empty area therein; and a connector part disposed on one side of the connector body. The connector part may include: a connector protruding from the connector body; and a connector holder seated in the empty area of the connector body and configured to secure the connector thereto. The connector holder may be configured to move the connector in one direction in response to an external force. A fixing part may be connected to one side of the connector body in a hinged fashion and being rotatable relative to the connector.

20 Claims, 17 Drawing Sheets

(56) References Cited

U.S. PATENT DOCUMENTS

| | | | |
|---|---|---|---|
| 8,986,029 B2* | 3/2015 | Webb | H05K 7/14 |
| | | | 174/135 |
| 9,240,695 B2 | 1/2016 | Xiang | |
| 2007/0153463 A1* | 7/2007 | Choi | H04B 1/207 |
| | | | 361/679.3 |
| 2008/0089547 A1* | 4/2008 | Young | G11B 33/124 |
| | | | 381/386 |
| 2008/0259550 A1* | 10/2008 | Lien | B60R 11/0211 |
| | | | 361/679.02 |
| 2009/0009957 A1* | 1/2009 | Crooijmans | G06F 1/1632 |
| | | | 361/679.41 |
| 2009/0129010 A1* | 5/2009 | Park | G06F 1/1632 |
| | | | 361/679.56 |
| 2010/0315041 A1 | 12/2010 | Tan | |
| 2011/0164375 A1 | 7/2011 | Hayashida et al. | |
| 2012/0264329 A1* | 10/2012 | Hayashida | G06F 1/1632 |
| | | | 439/529 |
| 2013/0058036 A1* | 3/2013 | Holzer | G06F 1/1632 |
| | | | 361/679.44 |
| 2013/0163186 A1* | 6/2013 | Mizusawa | H05K 7/14 |
| | | | 361/679.41 |
| 2013/0170131 A1* | 7/2013 | Yen | G06F 1/1632 |
| | | | 361/679.44 |
| 2013/0217448 A1 | 8/2013 | Kim et al. | |
| 2014/0118923 A1* | 5/2014 | Stanley | G06F 1/1626 |
| | | | 361/679.41 |
| 2014/0375249 A1 | 12/2014 | Xiang | |
| 2015/0036283 A1 | 2/2015 | Suckle et al. | |

* cited by examiner

CONNECTOR MODULE AND LOCKING DEVICE INCLUDING THE SAME

CLAIM OF PRIORITY

This application claims the benefit under 35 U.S.C. §119(a) of a Korean patent application filed on Feb. 27, 2015 in the Korean Intellectual Property Office and assigned Serial number 10-2015-0028653, the entire disclosure of which is hereby incorporated by reference.

TECHNICAL FIELD

The present disclosure generally relates to a connector module connected to an electronic device, and a locking device including the same.

BACKGROUND

Retail stores selling electronic devices often permit consumers to examine the device prior to a sale. It is necessary to supply electric power to the devices that are on display such that they are in a usable state. It is also desirable to provide some means for securing the device to prevent theft as they are frequently stolen.

While binding the electronic devices to a display stand may be considered, it is not desirable because the consumers desire to freely manipulate portable electronic devices while gripping them. Thus, there is a continuing need for a device that permits a consumer to freely manipulate displayed electronic devices while facilitating charging of the device and minimizing the potential for theft.

SUMMARY

Aspects of the present disclosure address at least the above-mentioned problems and/or disadvantages and to provide at least the advantages described below. Accordingly, an aspect of the present disclosure is to provide a connector module that allows rapid detection of separation of an electronic device (e.g., the removal of an electronic device from a connector module of a display) while supporting supply of electric power to the electronic device, and a locking device including the same.

Accordingly, another aspect of the present disclosure is to provide a connector module that can support a more stable separation of an electronic device while suppressing damage to the electronic device and/or damage to the connector module after being attached to the electronic device, and a locking device including the same.

Accordingly, still another aspect of the present disclosure is to provide a connector module that includes a connector coupled to an electronic device such that the connector is movable to hold the electronic device irrespective of the thickness of the electronic device or in a state in which various covers are coupled to the electronic device, and a locking device including the same.

In an aspect of the present disclosure, a connector module may include: a connector body including an interior space having an empty area therein; and a connector part disposed on one side of the connector body. The connector part may include: a connector protruding from the connector body; and a connector holder seated in the empty area of the connector body and configured to secure the connector thereto. The connector holder may be configured to move the connector in one direction in response to an external force. A fixing part may be connected to one side of the connector body in a hinged fashion and being rotatable relative to the connector.

In accordance with an aspect of the present disclosure, a connector module may include a connector part including a connector body having an empty space in the interior thereof, a connector protruding from the connector body and connected to a designated port of an electronic device, and a connector holder seated on the connector body, configured to fix the connector, and disposed such that the connector is moved in one direction by an external pressure or force.

In another aspect of the present disclosure, the fixing part may include a fixing panel to which a cable is configured to be connected and a bonding part disposed on one surface of the fixing panel and configured to move closer to the connector in response to the fixing part being rotated. The fixing part may also include an upper fixing plate, and wherein a width of the bonding part is larger than a width of the upper fixing plate. The connector module may also include deformable bonding part that includes a bonding layer that is disposed on at least one of opposite surfaces thereof, wherein the bonding layer is bonded to the bonding part.

In a further aspect of the present disclosure, the fixing part may include a lower fixing plate rotatably connected to one side of the connector body, the lower fixing plate including an upper surface; and an upper fixing plate that covers at least a portion of the upper surface of the lower fixing plate; and a coupling member that secures the upper fixing plate to the lower fixing plate. The lower fixing plate may include: a connection hole formed on one side of the cable and configured to inhibit movement of the cable; and a stopper holder that fixes an end of a molding stopper disposed within the connection hole. The lower fixing plate may include a cable cover that guides the cable such that the cable is configured to be inserted at a predetermined angle and an insertion state of the cable is maintained.

In a further aspect of the present disclosure, the fixing part may also include a sensor part disposed on one side of the fixing panel, wherein the sensor part is configured to sense a physical contact. The fixing part further may include a sensor pad inserted into a bracket disposed on one side of the fixing panel, the sensor pad being configured to support the sensor part. The fixing panel and the bonding part may include holes through which the sensor part is exposed to the outside. The connector module may include a cable connected to one side of the fixing part and at least one wire that is disposed inside the connector body.

In another aspect of the present disclosure, the connector part may include a bottom; and a guide body disposed to cover at least a portion of an opening of the connector body comprising side walls extending from peripheries of the bottom by a predetermined height and from which the connector protrudes. The connector holder may guide the connector such that the connector is moved in a predetermined direction along a guide groove formed in the guide body. The connector part further may include a connector printed circuit board (PCB) electrically connected to the connector; a light emitting diode (LED) disposed on one side of the connector PCB and configured to irradiate light according to supplied electric power; a through-hole formed on one side of the connector body; and an LED window seated in the through-hole and configured to irradiate light from the LED to the outside of the connector body. The connector part may include at least one resilient member disposed between the connector body and the connector holder and having a resilient force such that the connector holder returns to a predetermined position after being moved. The connector part may also include a connector pad disposed closer to the connector holder and disposed to absorb an impact resulting from a collision with the connector body.

In a further aspect of the present disclosure, the connector body may include a front side wall; left and right side walls connected to the front side wall; and a rear side wall connecting the left and right side walls. A height of the left and right side walls closer to the front side wall may be larger than a height of the left and right side walls closer to the rear side wall.

In accordance with another aspect of the present disclosure, a locking device may include a connector part including a connector protruding from a connector body having an empty space in at least an area of the interior thereof and being connected to a designated port of an electronic device, and a connector holder disposed such that the connector is movable in one direction; and a fixing part connected to one side of the connector body in a hinged fashion (or rotatably), being rotatable away from or closer to the connector, and in which a bonding part is disposed closer to the connector according to a designated rotation state.

In an aspect of the present disclosure, a locking device may include a connector part including a connector holder; a connector body; a connector protruding from a connector body, the connector part including an interior space having an empty area therein and being connected to a designated port of an electronic device by the connector holder, the connector holder permitting the connector to be movable in one direction; a fixing part including a fixing panel, the fixing part being rotatably connected to one side of the connector body; and a bonding part disposed on a surface of the fixing panel and being configured to move closer to the connector in response to the fixing part being rotated.

The locking device may include a control unit to which the connector module is electrically connected. The control unit may determine a contact state of the fixing part based on a sensor part for sensing a contract state of the fixing part and outputs guide information corresponding to a holding state of the electronic device. When the electronic device is at least one of separated from the connector part and separated from the contact state of the fixing part, the control unit may output guide information corresponding to the separation. These and other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
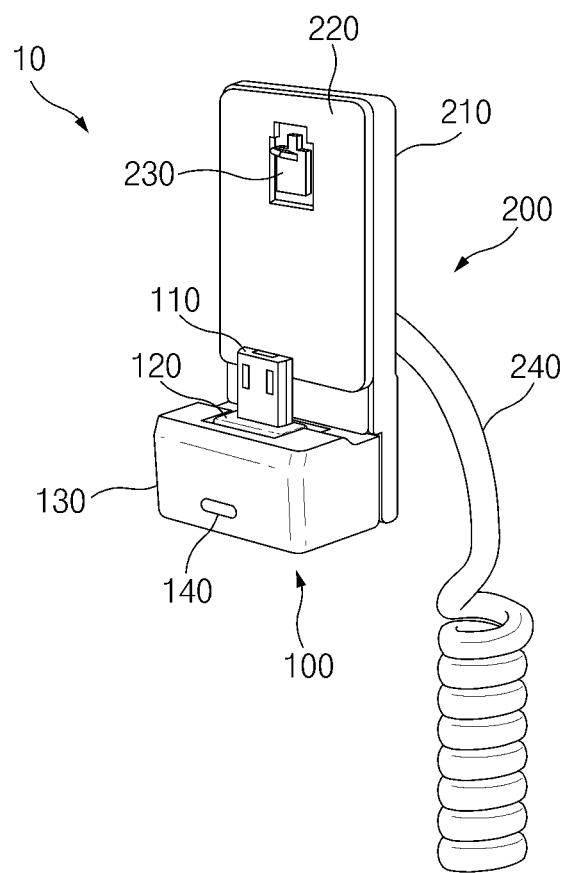
FIG. 1 is a perspective view of a connector module at a first angle according to an embodiment of the present disclosure.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to describing drawings, similar components may be marked by similar reference numerals.

In the disclosure disclosed herein, the expressions "have", "may have", "include" and "comprise", or "may include" and "may comprise" as used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" as used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of a smartphone, tablet personal computer (PC), mobile phone, video telephone, electronic book reader, desktop PC, laptop PC, netbook computer, workstation, server, personal digital assistant (PDA), portable multimedia player (PMP), Motion Picture Experts Group (MPEG-1 or MPEG-2) Audio Layer 3 (MP3) player, mobile medical device, camera, wearable device (e.g., a head-mounted-device (HMD), such as electronic glasses), an electronic apparel, an electronic bracelet, an electronic necklace, an electronic appcessory, an electronic tattoo, a smart mirror, a smart band, a smart watch, and the like.

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices according to an embodiment of the present disclosure may be one or more combinations of the above-mentioned devices. According to a certain embodiment of the present disclosure, an electronic device may be a flexible electronic. Also, electronic devices according to various embodiments of the present disclosure are not limited to the above-mentioned devices, and may include new electronic devices according to technology development Hereinafter, electronic devices according to an embodiment of the present disclosure will be described with reference to the accompanying drawings. The term "user" used herein may refer to a person who uses an electronic device or may refer to a device (e.g., an artificial electronic device) that uses an electronic device.

Figure 2:
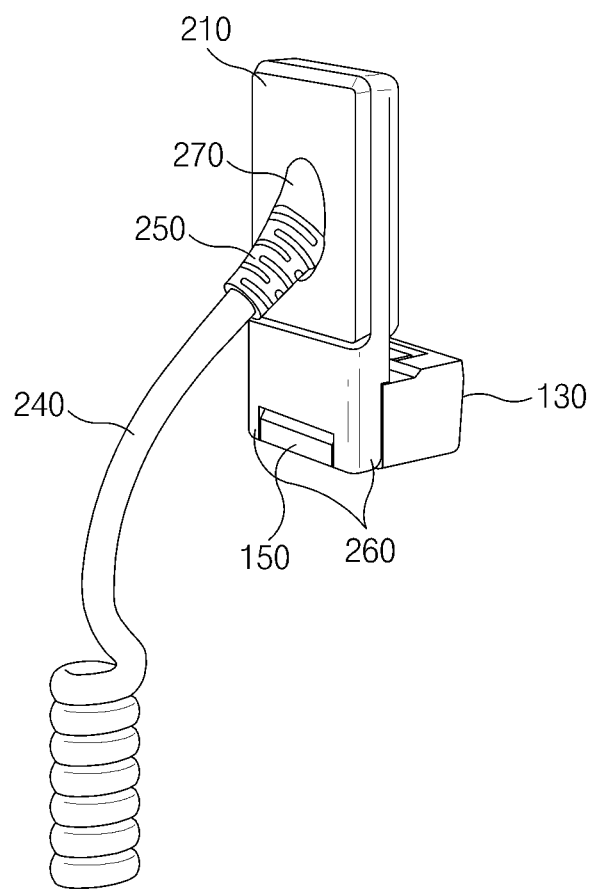
FIG. 2 is a perspective view of a connector module at a second angle according to an embodiment of the present disclosure.
Figure 3:
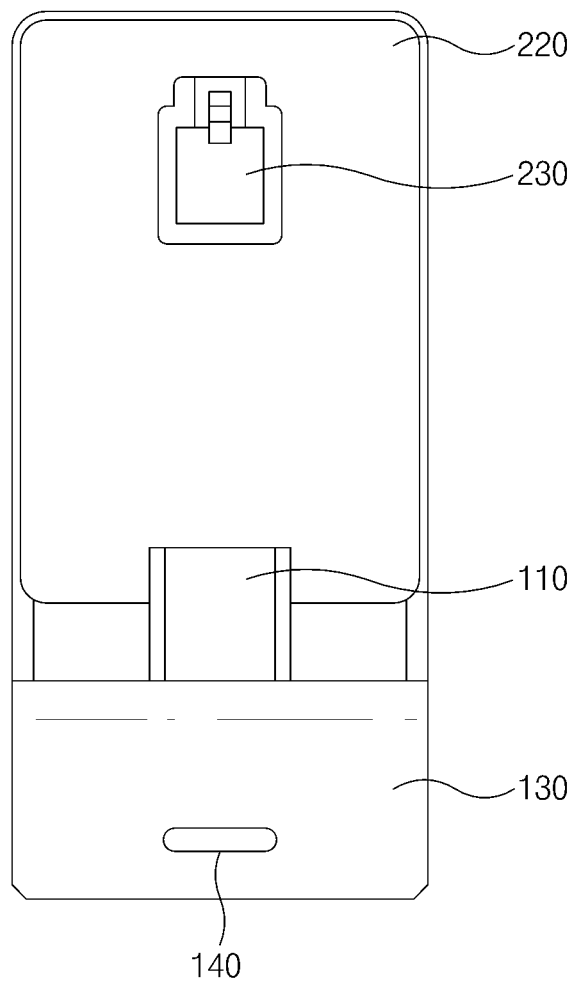
FIG. 3 is a front view of a connector module according to an embodiment of the present disclosure.
Figure 4:
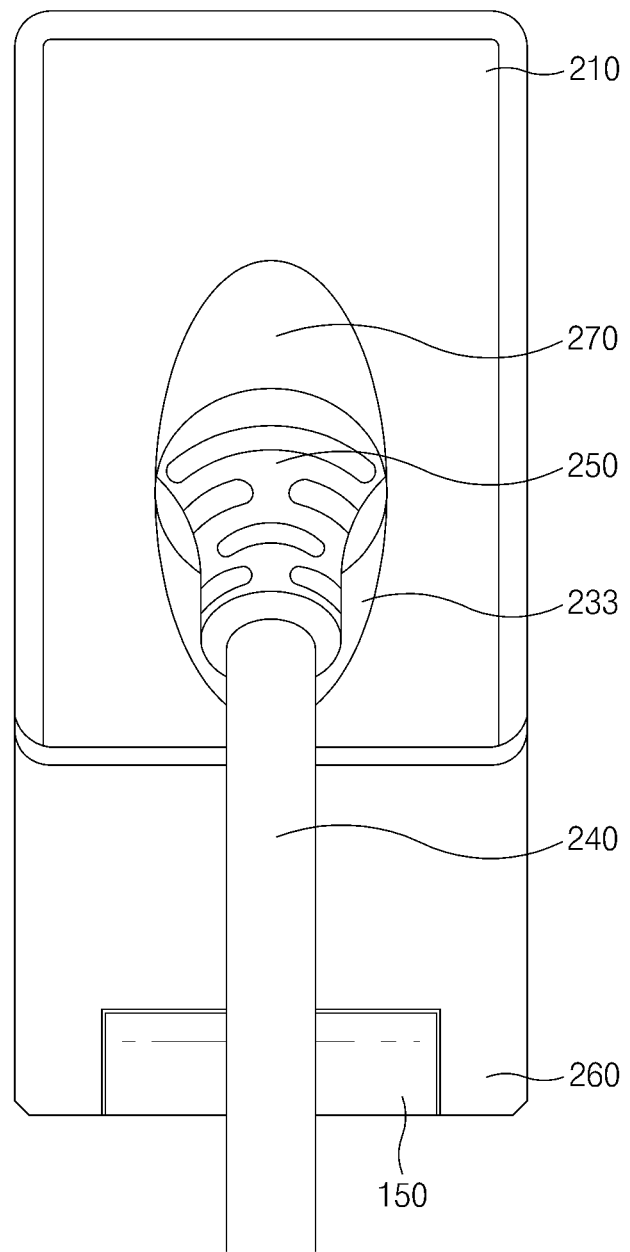
FIG. 4 is a rear view of a connector module according to an embodiment of the present disclosure.
Figure 5:
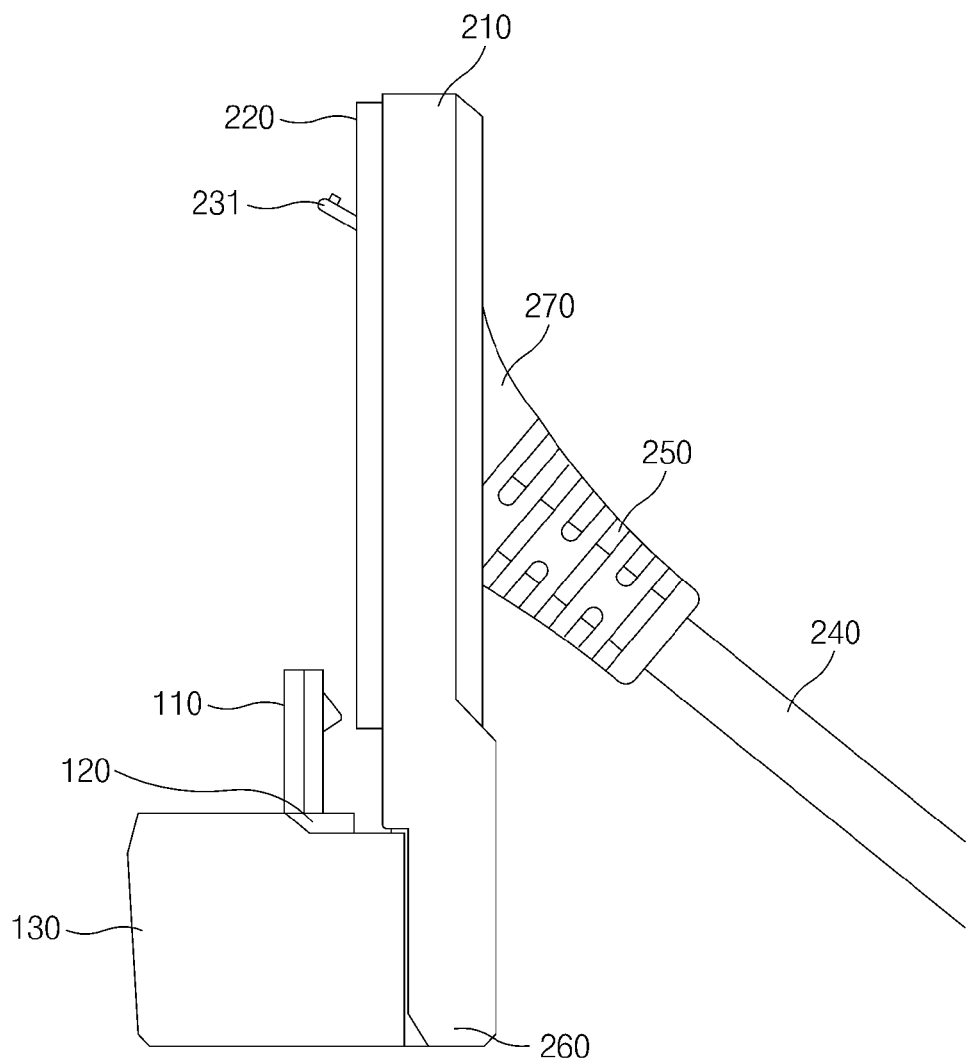
FIG. 5 is a left side view of a connector module according to an embodiment of the present disclosure.
Figure 6:
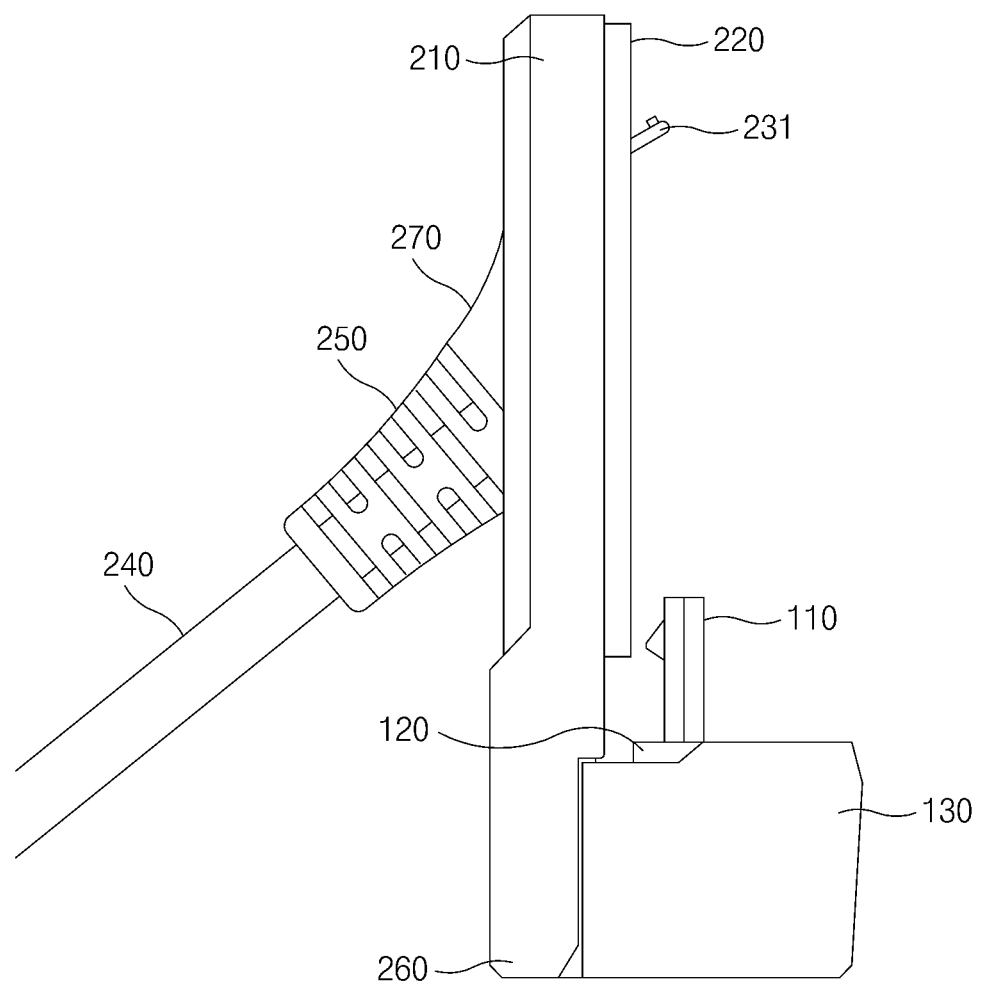
FIG. 6 is a right side view of a connector module according to an embodiment of the present disclosure.
Figure 7:
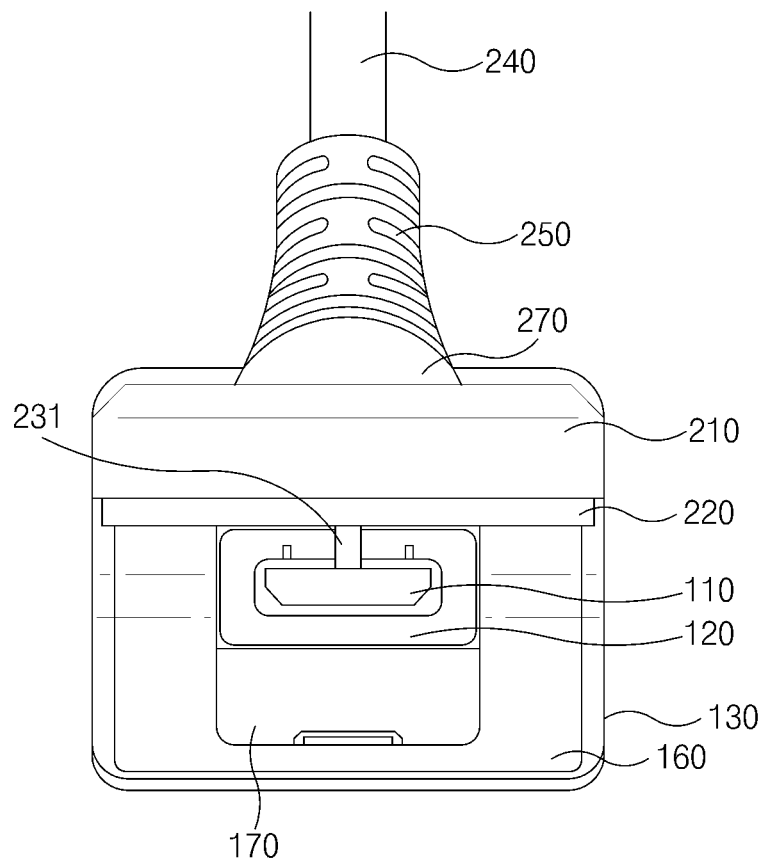
FIG. 7 is a plan view of a connector module according to an embodiment of the present disclosure.
Figure 8:
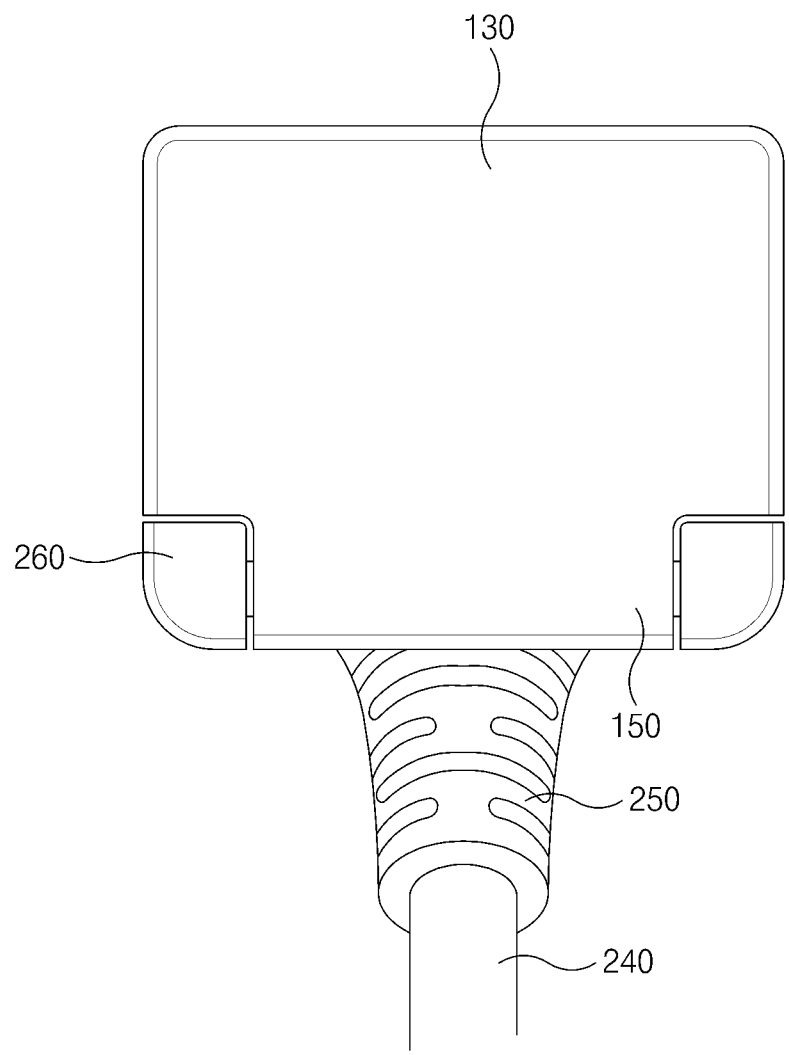
FIG. 8 is a bottom view of a connector module according to an embodiment of the present disclosure.
Figure 9:
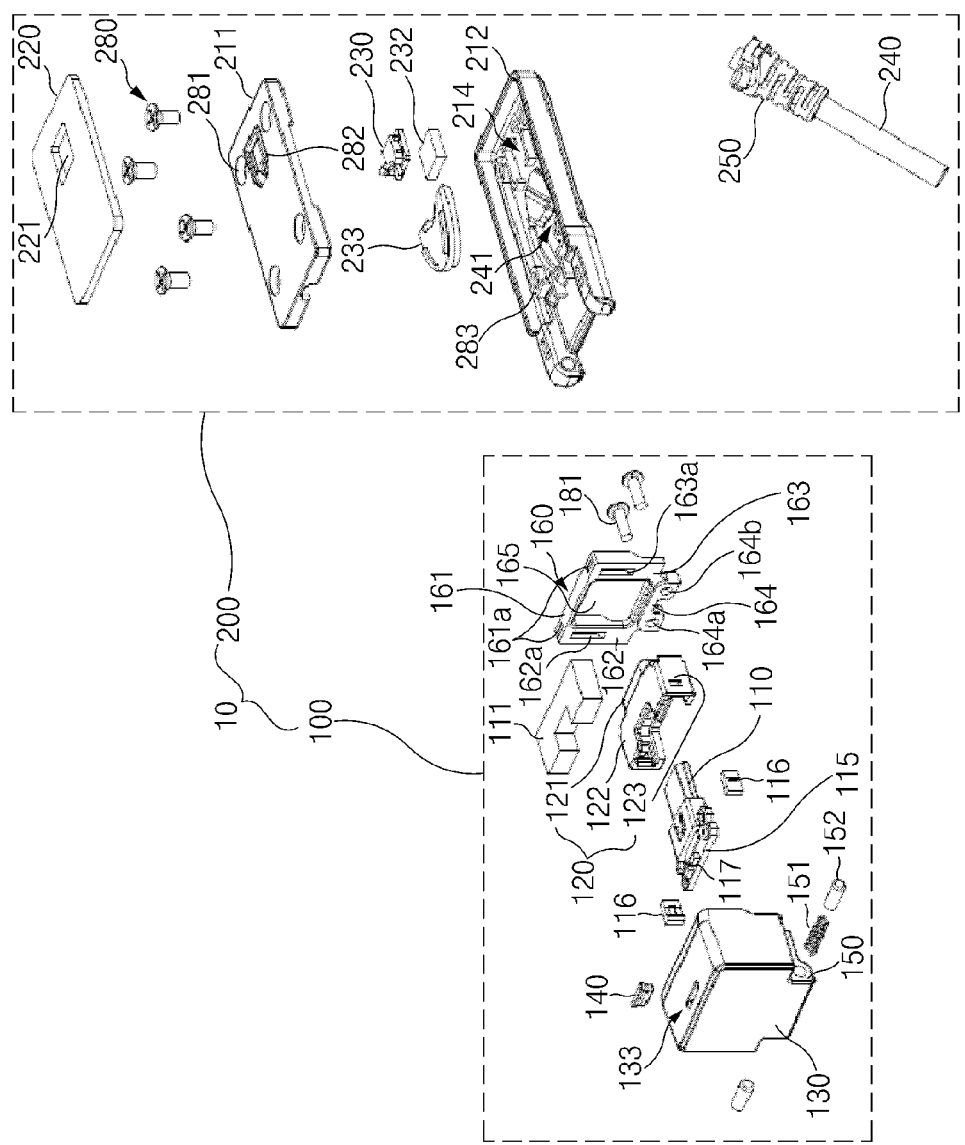
FIG. 9 is an exploded perspective view of a connector module according to an embodiment of the present disclosure.

FIG. 1 is a perspective view of a connector module (or connector assembly) at a first angle according to an embodiment of the present disclosure. FIG. 2 is a perspective view of a connector module at a second angle according to an embodiment of the present disclosure. FIG. 3 is a front view of a connector module according to an embodiment of the present disclosure. FIG. 4 is a rear view of a connector module according to an embodiment of the present disclosure. FIG. 5 is a left side view of a connector module according to an embodiment of the present disclosure. FIG. 6 is a right side view of a connector module according to an embodiment of the present disclosure. FIG. 7 is a plan view of a connector module according to an embodiment of the present disclosure. FIG. 8 is a bottom view of a connector module according to an embodiment of the present disclosure. FIG. 9 is an exploded perspective view of a connector module according to an embodiment of the present disclosure.

Referring to FIGS. 1 to 9, a connector module 10 according to an embodiment of the present disclosure may include a connector part 100 and a fixing part 200.

The connector module 10 may be provided such that a connector 110 arranged (or disposed) in the connector part 100 is moved towards the fixing part 200 or away from the fixing part 200. Accordingly, the connector module 10 allows electronic devices of various thicknesses to be inserted into the connector 110 irrespective of an interval between the connector part 100 and the fixing part 200. The connector module 10 is configured such that even an electronic device, on which a cover is mounted has a thickness that is larger than that of a released product, and may be inserted into the connector part 100.

The electronic device may be moved towards the fixing part 200 by using the connector 100 that may be moved after being inserted into the connector part 100. Accordingly, one surface of the electronic device may be fixedly bonded to the fixing part 200. When it is necessary to separate the electronic device bonded to the fixing part 200, the fixing part 200 may be separated from the electronic device by rotating the fixing part 200 connected to the connector part 100 in a hinged fashion in one direction.

At least one of the connector 110 may be arranged or disposed in the connector part 100 and a sensor part 230 may be arranged or disposed in the fixing part 200. The sensor part 230 may be used to help recognize mounting and detachment of the electronic device. Accordingly, when the electronic device is detached from the connector 110 or moved away from the sensor part 230, or the electronic device in contact with the sensor part 230 is released from the sensor part 230 by an undesignated or unauthorized manipulation, an alarm sound may be output by a designated unit (for example, a control unit).

As described above, in the connector module 10 according to the embodiment of the present disclosure, the electronic device may be inserted into the connector part 100 and may be attached to and held on the fixing part 200 irrespective of an external appearance of the electronic device and the attached electronic device may be easily separated. Further, the connector module 10 may help monitor mounting and detachment of the electronic device 10.

The connector part 100 may include a connector body 130, a connector hinge 150, a guide body 160, a connector 110, a connector PCB 115, connector hooks 116, a connector holder 120, a connector pad 111, an LED window 140, and a connector fixing member 181. The connector body 130, the connector hinge 150, the guide body 160, the connector holder 120, and the like may be formed of the same or similar materials. For example, the connector body 130, the connector hinge 150, the guide body 160, the connector holder 120, and the like may be formed of a plastic material or a non-conductive material.

The connector body 130 may be a case having a hollow box shape. According to an embodiment of the present disclosure, the connector body 130 may have a polygonal (for example, rectangular) bottom, and a plurality of side walls extending from peripheries of the bottom at a predetermined angle (for example, perpendicular) with respect to the bottom. According to various embodiments of the present disclosure, the connector body 130 may have a circular (or an elliptical shape of which an eccentricity is not zero) bottom, and side walls arranged to surround some of peripheries of the circular bottom. The side walls may form one circular periphery or a plurality of side walls having clearances at a predetermined interval may be arranged in a row.

The connector body 130 may have, for example, an opened upper side. At least a portion of the connector body 130 may be closed by the guide body 160. A through-hole 133 may be formed in one of the side walls of the connector body 130 such that an LED window 140 is arranged in the side wall. For example, the through-hole 133 may be arranged on one side of a lower portion of a side wall arranged on the front surface of the connector body 130. The shape of the through-hole 133 may correspond to the shape of the LED window 140.

A hook boss that may be coupled to a hook recess 161*a* (FIG. 9) of the guide body 160 may be arranged on the inside of the front side wall of the connector body 130. A step may be formed on the inside of the front side wall of the connector body 130 such that the guide body 160 does not enter the inside of the connector body 130 further past a predetermined depth. The step may be arranged such that one side of the guide body 160, for example, a peripheral portion of the guide body 160 having the hook recess 161*a* is seated on the step.

According to various embodiments of the present disclosure, left and right side walls extending from the front side wall of the connector body 130 may have stepped upper end. For example, the left side wall and the right side wall of the connector body 130 may have steps such that areas thereof that are close to the front side wall are higher than areas thereof that are distant from the front side wall. A portion of a cover coupled to the electronic device and the like may be arranged at the upper ends of the left side wall and the right side wall that are relatively low while the electronic device is mounted on the connector part 100.

The rear side wall of the connector body 130 may protrude from the bottom of the connector body 130 rearwards by a predetermined length. The rear side wall may have substantially the same height as the stepped height of the left side wall and the right side wall. A plurality of coupling columns having coupling holes may be arranged on the rear side wall of the connector body 130 such that the guide body 160 is fixed to the connector body 130. The connector fixing member 181 may be coupled to the rear side wall of the connector body 130 having the coupling columns through a hole formed in the guide body 161. An upper end of the rear side walls may selectively face one side of the fixing part 200 that is operated rotatably (or in a hinged fashion), for example, one side of a fixing panel 210. The corners of the above-described connector body 130 may be rounded.

The connector hinge 150 may be provided based on a portion of the rear side wall of the connector body 130. For example, the connector hinge 150 may be arranged at lower ends of the coupling columns. The connector hinge 150 may have holes formed at a lower end of the rear wall of the connector body 130 in parallel to the coupling columns, and hinge structures that are inserted into the holes. The hinge structures may include, for example, a hinge spring 151 and a hinge pin 152. At least a portion of the hinge pin 152 may be inserted into the hinge recess provided in a panel hinge 260.

As shown in FIG. 9, the guide body 160 may be provided to cover at least a portion of the opened area of the connector body 130. For example, a movement hole 165 may be formed at the center of the guide body 160, and guide side walls 161, 162, 163, and 164 may be arranged to surround the movement hole 165. The guide side walls 161, 162, 163, and 164 may include, for example, a first guide side wall 161 that has a hook recess 161*a* coupled to the hook boss formed on the front side wall of the connector body 130 while facing the front side wall of the connector body 130, a second guide side wall 162 and a third guide side wall 163 that are connected to opposite peripheries of the first guide side wall 161 perpendicular to (or having a predetermined angle with)

the first guide side wall 161, and a fourth guide side wall 164 connecting the second guide side wall 162 and the third guide side wall 163.

The second guide side wall 162, for example, an upper end of the second guide side wall 162 may have a step in which the height of an area that is close or adjacent to the first guide side wall 161 is higher than an area that is close or adjacent to to the fourth guide side wall 164. A first guide groove 162a may be arranged on the bottom of the second guide side wall 162. A wing of the connector holder 120 that fixes the connector 110 may be inserted into the first guide groove 162a. The first guide groove 162a may have a predetermined length in a lengthwise direction of the second guide side wall 162. The third guide side wall 163 may have a shape that is the same as or similar to that of the second guide side wall 162. For example, the third guide side wall 163 has a stepped upper surface, and may have a second guide groove 163a.

The fourth guide side wall 164 connects the second guide side wall 162 and the third guide side wall 163 and may have holes 164a and 164b that are coupled to the coupling holes of the rear side wall of the connector body 130 after being aligned with the coupling holes of the rear side wall of the connector body 130. The connector fixing member 181 may pass through the fourth guide side wall 164 having the holes 164a and 164b and may face upper ends of the coupling columns formed on the rear side wall of the connector body 130 during assembly.

The connector 110 may be inserted into a connection port provided in the electronic device. The connector 110 may have, for example, a designated shape (for example, a standard USB, a micro USB, or a UART). At least one electrical contact point may be arranged on the inside or outside of the exposed area of the connector 110. The electrical contact point may be electrically connected to contact points provided in the connection port of the electronic device. Bosses may be arranged on one side of the connector 110. The bosses may be arranged such that the positions of the bosses may be deformed by resiliency. The area of the connector 110 that is not exposed may be connected to the connector PCB 115.

The connector PCB 115 may include a plurality of signal lines electrically connected to the connector 110. The connector PCB 115 may be electrically connected to one or more signal lines included in a cable 240. The connector PCB 115 may help monitor insertion of the connector 110 of the electronic device, and may supply electric power to the electronic device under the control of a control unit when the electronic device is inserted. An LED 117 may be arranged on one side of the connector PCB 115. For example, the LED 117 may be arranged at a lower end of the connector PCB 115. When the electronic device is mounted on the connector 110, the LED 117 may output a designated color. The light output from the LED 117 may be irradiated to the LED window 140. The LED 117 may output at least one color. The connector PCB 115 may perform a control such that light having a designated color is output through the LED 117 according to a battery charging state of the connected electronic device, a mounting/detaching state of the electronic device, and the like. For example, a current state may be distinguished by outputting a first color (for example, a blue based color) when the electronic device is mounted, and outputting a second color (for example, a red based color) when the electronic device is detached. Light of the LED 117 may be flickered at a predetermined period according to a battery charging state, a mounting/detaching state of the electronic device, and the like. As described above, the LED 117 may output designated colors or may be operated according to a designated flickering pattern in response to the mounting state (for example, at least one of a state in which the electronic device is inserted into the connector 110 and a state in which the electronic device makes contact with the sensor part 230) of the electronic device.

According to an embodiment of the present disclosure, the LED 117 may output a plurality of colors designated for the mounting states of the electronic device. For example, if the electronic device is mounted, the LED 117 may change and output at least one of plurality of designated colors (for example, red, blue, and green) for a designated time period corresponding to a particular state or may alternate among the plurality of colors. Thereafter, the LED 117 may continuously output until a designated color (for example, red) is charged up to a designated reference value or more, in relation to charging of the electronic device. When the electronic device is fully charged, the LED 117 may alternately output a plurality of designated colors (for example, green and yellow) as the electronic device is charged, and may output one color (for example, green) after elapse of a designated time period. The LED 117 may output designated colors according to a charging requiring state, a charging state, and a charging completed state of the electronic device. The colors, the alternation time interval or the alternation sequence may be changed according to an intention of the designer or may be adjusted according to settings of the control unit.

The connector holder 120 may be provided to surround the connector 110 and the connector PCB 115. In this regard, the connector holder 120 may include a connector insertion part 121 into which the connector 110 is fixedly inserted, and a PCB body 122 into which the connector PCB 115 is fixedly inserted. The connector insertion part 121 may fix a portion of a lower end of the connector 110. The connector 110 passes through the connector insertion part 121 to be exposed, and may be moved in response to the movement of the connector holder 120 after a portion of the lower end of the connector 110 is fixed to the connector insertion part 121. The PCB body 122 may be provided to surround most of the areas of the connector PCB 115. According to an embodiment of the present disclosure, the PCB body 122 may be provided such that an area thereof in which the LED 117 is arranged is exposed. According to various embodiments of the present disclosure, the connector holder 120 may further include wings 123 arranged on opposite sides of the PCB body 122. The wings 123 may protrude from an upper end of the PCB body 122 by a predetermined height. The wings 123 may be inserted into the first guide groove 162a and the second guide groove 163a formed in the second guide side wall 162 and the third guide side wall 163 and be moved along a direction of the guide grooves.

The connector hooks 116 may be coupled to opposite peripheries of a lower end of the connector PCB 115. The connector PCB 115, to which the connector hook 116 is coupled, may be fixedly inserted into the connector holder 120. The connector hooks 116 may be coupled to the inside of the PCB body 122 of the connector holder 120 such that the connector PCB 115 is stably fixedly inserted into the connector holder 120.

The connector pad 111 may have a cross-section that is similar to the cross-section of the PCB body 122 of the connector holder 120. The connector pad 111 may be attached to a front surface of the PCB body 122 of the connector holder 120. The connector pad 111 may prevent damaged to the connector holder 120. The connector pad 111 may limit a distance by which the connector holder 120 is moved in the connector body 130. The connector pad 111 may be formed of, for example, a material that may damp an impact occurring due to a collision of the connector holder 120 and the connector body 130 while the connector holder 120 is moved. For example, the connector pad 111 may be formed of a material such as plastic, rubber, or polyurethane that has a resiliency.

The LED window 140 may be inserted into the through-hole 133 formed on a front side wall of the connector body 130. The LED window 140 may be formed of a transparent or translucent material, for example, having a white color or a grey color. For example, the LED window 140 may be formed of a material such as transparent plastic, transparent acryl, glass, or the like. The LED window 140 may function to expose light irradiated from the LED 117 arranged in the connector PCB 115. The LED window 140 may prevent dazzling due to the illumination of the LED 117 by partially removing light energy irradiated from the LED 117. The LED window 140 may have various shapes in response to the shape of the through-hole 133. For example, the LED window 140 may have a straight line or polygonal shape. Further, the LED window 140 may have a circular or elliptical shape. According to an embodiment of the present disclosure, the LED window 140 may have a conical shape (a form in which the cross-section of the LED window 140 becomes gradually larger as it goes from the inside to the outside of the front surface of the connector body 130) to diffuse and irradiate light generated by the LED.

The connector fixing member 181 may include one or more fastening elements (or fastening unit, or fastening device), such as bolts, that passes through the fourth guide side wall 164 of the guide body 160 and is coupled to the coupling columns arranged in the connector body 130. The fastening elements (e.g., bolts) may be formed of, for example, a metallic material or a reinforced plastic material.

The fixing part 200 may include a fixing panel 210, a bonding part 220, a molding stopper 250, and a cable 240. The fixing part 200 may include the fixing panel having a substantially polygonal shape (for example, a rectangular shape). The fixing part 200 may fix one side of the rear surface of the electronic device mounted on the connector part 100 based on the bonding part 220 provided on one side of the fixing panel 210. The fixing part 200 may include a cable 240 connected to a rear surface of the fixing panel 210. Some of a plurality of wires of the cable 240 may be connected to the sensor part 230 to supply electric power for an operation of the sensor part 230 and transmit and receive signals according to the operation of the sensor part 230. Further, some of the plurality of wires of the cable 240 may be connected to the connector PCB 115 of the connector part 100 to supply electric power and transmit and receive signals. The above-described fixing part 200 may be connected to the connector part 100 in a hinged fashion.

As seen best in FIG. 9, the fixing part 200 may include an upper fixing plate 211, a lower fixing plate 212, a sensor part 230, a sensor pad 232, a stopper holder 233, and a coupling member 280.

The upper fixing plate 211 may generally have a top surface having a predetermined area, and side walls extending from peripheries of the top surface perpendicular to the top surface by a predetermined length. The upper fixing plate 211 may have, for example, a rectangular shape of which one side is relatively long. The upper fixing plate 211 may have a predetermined size to cover an opening of the lower fixing plate 212. For example, while the upper fixing plate 211 is seated on the lower fixing plate 212, a side of the upper fixing plate 211 may face an inner surface of a side wall of the lower fixing plate 212. The upper fixing plate 211 may have one or more coupling holes 281. The illustrated drawing exemplifies that the upper fixing plate 211 has four coupling holes 281, but the number and locations of the coupling holes 281 may be changed according to a design manner. An exposure hole 282 may be provided on one side of the top surface of the upper fixing plate 211 such that the sensor part 230 is exposed through the exposure hole 282. The exposure hole 282 may have a shape corresponding to the shape of the sensor part 230. A wiring groove (not shown) may be formed on a side surface of a lower portion of the upper fixing plate 211 such that some wires are of the cable 240 arranged in the wiring groove. The wiring groove may be formed by removing the center or an area adjacent to the center of the lower side wall of the upper fixing plate 211. Some wires connected to the connector PCB 115 of the connector part 100 may be fixed or guided by the wiring groove.

The lower fixing plate 212 may generally have a bottom having a predetermined area, and side walls extending from peripheries of the bottom perpendicular to the bottom by a predetermined height. According to an embodiment of the present disclosure, the lower fixing plate 212 may be configured such that a side wall of a lower portion of the lower fixing plate 212 is removed or not formed for some wires of the cable 240 that are arranged in the connector part 100. The lower fixing plate 212 may, for example, an upper side wall and left and right side walls. The lower fixing plate 212 may be longer than the upper fixing plate 211. Coupling recesses 283 may be arranged on one side of the lower fixing plate 212 at locations corresponding to the coupling holes 281 of the upper fixing plate 211. Screw threads (not shown) may be formed in the coupling recesses 283. The lower fixing plate 212 may have a bracket 214 on which the sensor part 212 is seated, a connection hole 241 in which the molding stopper 250 of the cable 240 is seated, and panel hinges 260 hinge-coupled to the connector part 100.

The panel hinges 260 extend longer from the left and right side walls of the lower fixing plate 212 towards the connector part 100, and may include a left panel hinge and a right panel hinge that are thicker than the left and right walls of the lower fixing plate 212. Portions of the panel hinges 260 may be connected to each other by the bottom of the lower fixing plate 212. The heights of the panel hinges 260 are larger than the heights of the left and right side walls. A stepped surface formed by the steps between the left and right walls of the lower fixing part 212 and the panel hinges 260 may face the upper surfaces of the coupling columns arranged on one side of the connector part 100 while the fixing part 200 is rotated towards the connector part 100. Hinge recesses may be formed on the insides of ends of the left panel hinge and the right panel hinge. At least a portion of the hinge pin 152 provided in the connector part 100 may be inserted into the hinge recesses.

The bracket 214 may extend from the bottom surface of the lower fixing plate 212 by a predetermined height. For example, as illustrated in drawings, the bracket 214 may be shaped such that C-shaped side walls face each other, but various embodiments of the present disclosure are not limited thereto. For example, the bracket 214 may have columns having rectangular band-shaped cross-sections. The shape of the bracket 214 may be adjusted to correspond to the external shape of the sensor part 230. The sensor pad 232 may be arranged in the bracket 214. The sensor pad 232 may function to absorb a physical pressure applied (or put) to the sensor part 230 while supporting the bottom surface of the sensor part 230.

The sensor part 230 may include, for example, a pressure sensor or a proximity sensor. The sensor part 230 may be provided such that, for example, a needle of the sensor 231 protrudes from a surface of a chip. The sensor needle 231 may be connected to the chip to be rotated in one direction. For example, the sensor needle 231 may be arranged to have a predetermined inclination from a surface of the upper fixing plate 211 toward the upper side of the upper fixing plate 211. The sensor needle 231 may protrude from the upper fixing plate 211 and have a predetermined height from a surface of the bonding part 220. According to an embodiment of the present disclosure, the length of the sensor needle 231 may be determined such that the electronic device is not interfered while being mounted into the connector 110. For example, the length of the sensor needle 231 may be determined such that an end of the fixing part 100 that protrudes from a surface of the upper fixing plate 211 is arranged perpendicular to the connector 110 (the connector 110 is moved towards the fixing part 200 by a predetermined length) while the fixing part 200 is arranged perpendicular to the connector part 100. Alternatively, the length of the sensor needle 231 may be configured such that an end of the sensor needle 231 does not extend past the interior of the connector 110 arranged perpendicularly.

For example, a portion of the molding stopper 250 of the cable 240 may be inserted into the connection hole 241. The connection hole 241 may be formed at the center of the bottom of the lower fixing plate 212 or a central portion of the bottom of the lower fixing plate 212 that closer to the upper side. Accordingly, the cable 240 inserted into the connection hole 241 may be connected while having a predetermined inclination (for example, in a range of 20 degrees to 60 degrees or around 40 degrees). As illustrated, the connection hole 241 may include a cable cover 270 protruding to an outer surface of the lower fixing plate 212. A stopper holder 233, into which at least one wrinkle of the molding stopper 250 is inserted, may be arranged on the bottom of the lower fixing plate 212 in which the connection hole 241 is formed.

The bonding part 220 may be arranged to cover, for example, at least a portion of the upper fixing plate 211. The bonding part 220 may include, for example, sponge, to which a bonding material having a predetermined thickness is (coated or spread), or a tape formed of a bonding material and having a predetermined thickness. After the bonding part 220 is manufactured, bonding layers are formed on opposite surfaces of the bonding part 220 such that the bonding part 220 is attached to the upper fixing plate 211 and the electronic device. A sensor hole 221 may be formed on one side of the bonding part 220 such that the sensor part 230 is exposed through the sensor hole 221. The size of the sensor hole 221 is determined such that the sensor needle 231 does not make contact with the bonding part 220 even though the sensor needle 231 is pressed by the electronic device. Alternatively, the length of the sensor needle 231 may be determined such that the sensor needle 231 does not contact the bonding part 220 even though the sensor needle is pressed by the electronic device. Although as described, the bonding part 220 is smaller than the area of the upper fixing part 211, it may instead be larger than the area of the upper fixing plate 211.

Coupling members 280 may fix the upper fixing plate 211 and the lower fixing plate 212 while being inserted into the coupling holes 281 of the upper fixing plate 211. For example, the coupling members 280 may include, for example, fastening elements or bolts that pass through the coupling holes 281 and are coupled to the screw threads on the insides of the coupling recesses 283 formed in the lower fixing plate 212. Because the bonding part 220 may be arranged on the coupling members 280 after the coupling members 280 couple the upper fixing plate 211 and the lower fixing plate 212, the heads of the coupling members 280 may not be exposed to the outside.

The molding stopper 250 may be a molding structure that is arranged at an end of the cable 240 such that a cross-section thereof becomes gradually larger. At least one wrinkle may be arranged in the molding stopper 250 to fix the cable 240. The at least one winkle may be fixedly inserted into the stopper holder 233 arranged around the connection hole 241. The wrinkle of the molding stopper 250 may include bands formed at at least a portion around the cable 240, and connection ends that connects the bands perpendicularly.

The stopper holder 233 may be arranged to partially close the connection hole 241 arranged in the lower fixing plate 212. The stopper holder 233 may function to fix one side of the molding stopper 250 of the cable 240 inserted through the connection hole 241 of the lower fixing plate 212. The stopper holder 233 may be fixed to the inside of the connection hole 241 through coupling of the upper fixing plate 211.

One or more wires may be disposed inside the cable 240. The above-described molding stoppers 250 may be arranged at one end of the cable 240 to fix the cable 240 to the connection hole 241. An opposite end of the cable 240 may be provided, for example, in the form of a USB connector. The opposite end of the cable 240 may be electrically connected to a control unit of a locking device. The cable 240 may include a wire for supplying electric power to the sensor part 230 and the connector 110, a wire for transmitting a sensor signal of the sensor part 230 to the control unit, and a wire for communication with the electronic device connected to the connector 110. At least a portion of the cable 240 may be provided in the form of a wrinkle to improve movement of the connector module 10. According to various embodiments of the present disclosure, the cable 240 may be connected to the lower fixing plate 212 while having a predetermined angle. For example, the cable 240 may be connected to the lower fixing plate 212 while having a predetermined angle (for example, 20 to 60 degrees or designated 50 degrees or 40 degrees) with respect to a surface of the lower fixing plate 212. According to various embodiments of the present disclosure, the cable 240 may be connected to the lower fixing plate 212 perpendicularly to a surface of the lower fixing plate 212. In this case, at least a portion of the cable 240 may be covered. Alternatively, the cable 240 may be provided such that the stopper holder 233 is stopped by at least a portion of the molding stopper 250 arranged of the cable 240.

The cable 240 may be connected to the connection hole 241 formed at the center of the lower fixing plate 212. Here, the location of the connection hole 241 may be adjusted. For example, the connection hole 241 may be arranged closer to the upper side of the lower fixing plate 212. In this case, the cable 240 may be arranged closer to the upper side of the lower fixing plate 212. Alternatively, the connection hole 241 may be arranged closer to the lower side of the lower fixing plate 212. Accordingly, the cable 240 may be arranged closer to the lower side of the lower fixing plate 212.

According to various embodiments of the present disclosure, the cable 240 may be connected to the connector body 130. For example, the cable 240 may be connected to a predetermined point (for example, a predetermined point at the center of the front side wall of the connector body 130 or an upper or lower end of the front side wall of the connector body 130) of the front side wall of the connector body 130. In this case, the plurality of wires of the cable 240 may be directly connected to the connector PCB 115. Some of the wires of the cable 240 (for example, the wires for an operation of the sensor part 230) may be arranged in the fixing panel 210 through the connector body 130. The state in which the cable 240 is connected to the connector body 130 may be a state in which the cable 240 may be inserted into the connector body 130, for example, perpendicularly to the front side wall of the connector body 130. The cable 240 may be connected to the connector body 130 at a designated angle (for example, a range of 20 degrees to 70 degrees with respect to the bottom of the connector body 130 or a surface of the front side wall of the connector body 130). When the cable 240 is connected to the connector body 130, the stopper holder 120 may be arranged at a predetermined point on the inside of the front side wall of the connector body 130. The molding stopper 250 may be arranged at an end of the cable 240 to provide a stable fixing state while the cable 240 is connected to the connector 130. The cross-section of the molding stopper 250 may become larger as it goes from a predetermined point adjacent to the end of the cable 240 to the end of the cable 240. A connection recess structure may be formed on the front side wall of the connector body 130 for connection of the molding stopper 250.

Figure 10:
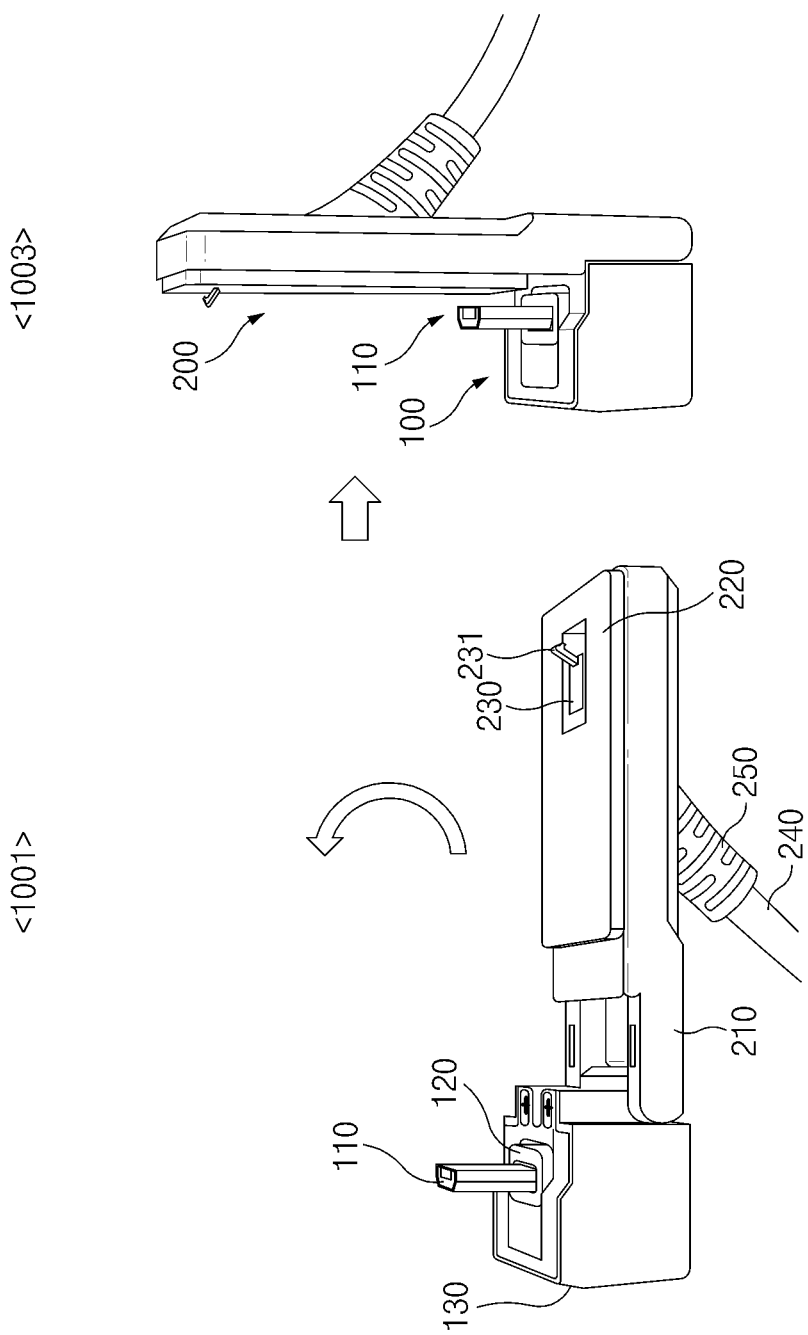
FIG. 10 is a perspective view exemplifying a connector module in a moved state according to an embodiment of the present disclosure.

FIG. 10 is a perspective view exemplifying a connector module in a moved state according to an embodiment of the present disclosure.

Referring to FIG. 10, as in state 1001, the fixing part 200 may be rotated while taking the panel hinge formed on one side of the fixing panel 210 and the connector hinge 150 of the connector part 100 as its rotational axis. The drawing illustrates a state in which the fixing part 200 is rotated from the connector part 100 at a predetermined angle (for example, 90 degrees). Accordingly, the fixing panel 210 of the fixing part 200 may be arranged in parallel to the connector body 130.

As mentioned above, the fixing part 200 may be rotated at a predetermined angle while taking the connector part 100 as its rotational axis. For example, the fixing part 200 arranged in parallel to the connector part 100 may be arranged perpendicularly to the connector part 100 through rotation thereof as in state 1003. In this case, the fixing part 200 may be arranged such that one side of a lower portion (for example, the lower fixing plate 212) of the fixing panel 210 may fact one side (for example, a peripheral portion of the connector part 100 or a peripheral portion of the guide body 160) of the connector part 100.

Figure 11:
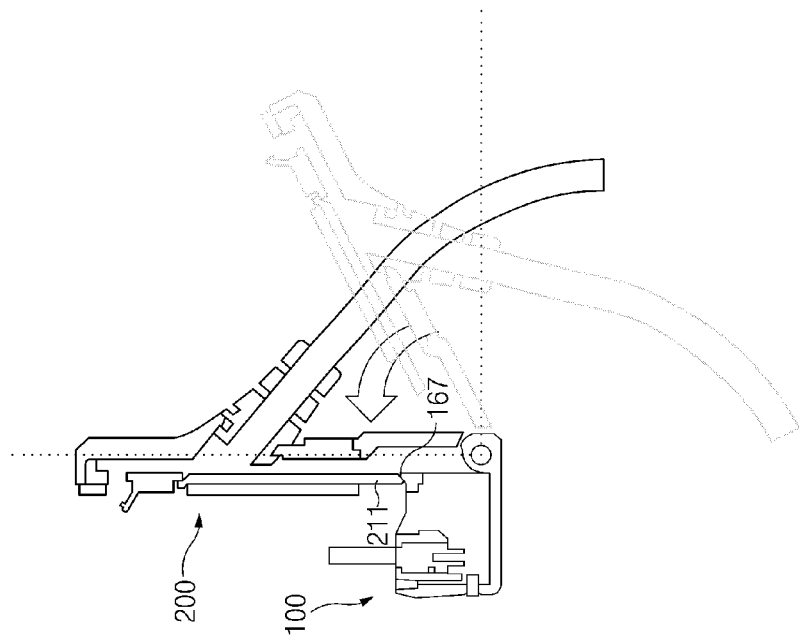
FIG. 11 is a sectional view exemplifying a connector module in a moved state according to an embodiment of the present disclosure.
Figure 11:
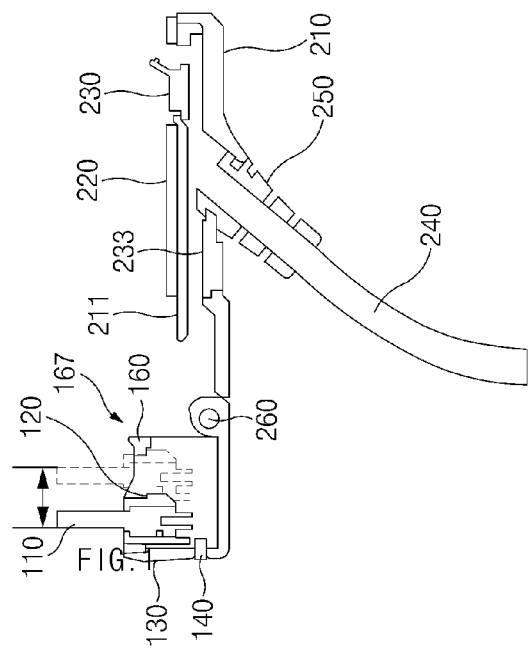

FIG. 11 is a sectional view exemplifying a connector module in a moved state according to an embodiment of the present disclosure.

Referring to FIG. 11, as described above with reference to FIG. 10, the state of the fixing part 200 may be switched from a state in which the fixing part 200 is arranged in parallel to the connector part 100 as in state 1101 to a state in which the fixing part 200 is perpendicular to the connector part 100 as in state 1103. According to an embodiment of the present disclosure, a stopping step 167 may be arranged on one side of the guide body 160. The stopping step 160 may be arranged, for example, between the holes of the fourth guide side wall of the guide body 160. Accordingly, while the fixing part 200 is deformed to a location in which the fixing part 200 is arranged perpendicularly to the connector part 100 as in state 1103, an end (for example, a lower side wall of the upper fixing plate 211) of the upper fixing plate 211 may be coupled to the stopping step 167.

According to various embodiments of the present disclosure, the wires of the cable 240 may be arranged in the connector part 100 through an empty space formed between the upper fixing plate 211 and the lower fixing plate 212. Here, a passage may be arranged at a lower portion of a portion at which the wires are connected to the fixing part 200 of the connector body 130 such that the wires may be inserted through the passage. The wires inserted through the passage may be electrically connected to the connector PCB 115.

According to various embodiments of the present disclosure, at least one resilient member may be arranged between the inside of the connector body 130 and the connector PCB 115. According to an embodiment of the present disclosure, the first resilient member may show a resilient force to push out the connector PCB 115 towards the fixing part 200. Accordingly, after being arranged closer to the fixing part 200 in the movement hole 165 of the guide body 160 by the first resilient member, the connector 110 may be moved towards the LED window 140 in response to an external pressure. According to an embodiment of the present disclosure, a second resilient member may be arranged between the connector PCB 115 and a rear side wall of the connector body 130. The second resilient member may show a resilient force, for example, in a direction in which the connector PCB 115 is pulled towards the rear side wall of the connector body 130. The electronic device may have a predetermined thickness, and may be inserted into the connector 110. When the electronic device is connected to the connector 110, the electronic device and connector may be moved by a thickness that exceeds a predetermined margin towards the front side wall of the connector body 130 while the fixing part 200 is attached to the rear surface of the electronic device.

Figure 12:
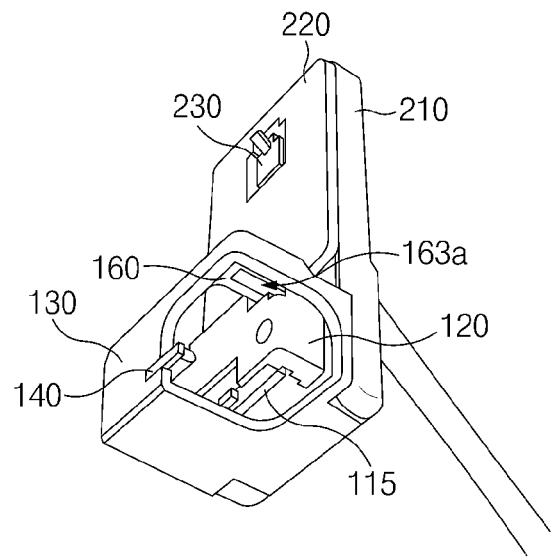
FIG. 12 is a view illustrating a connector module in a state in which a connector is moved according to an embodiment of the present disclosure.
Figure 12:
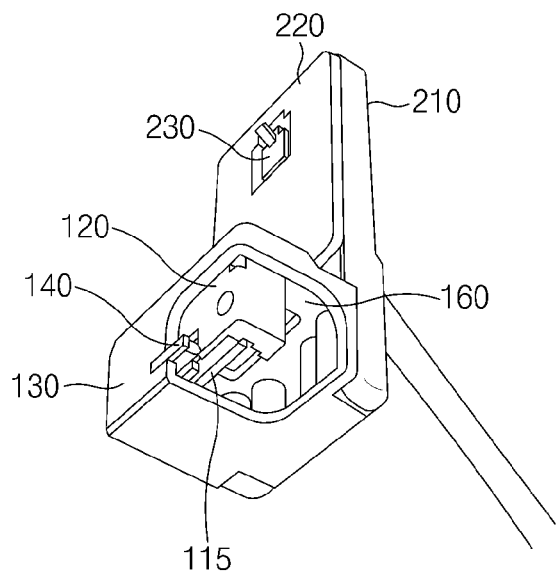

FIG. 12 is a view illustrating a connector module in a state in which a connector is moved according to an embodiment of the present disclosure.

Referring to FIG. 12, the connector 110 may be arranged in the guide body 160 closer to the fixing part 200 as in state of 1201. Furthermore, the connector 110 may be moved to be arranged in the guide body 160 at a distant location from the fixing part 200 as in state 1203. In this regard, when the connector 110 is located closer to the front side wall of the connector body 130, the connector 110 may be moved by a force or pressure such that it moves closer to the rear side wall of the connector body 130. Furthermore, when the connector 110 is located closer to the rear side wall of the connector body 130, the user may move (e.g., by pressing) the connector such that the connector is moved closer to the front side wall of the connector body 130.

If a pressure or force is applied, the connector holder 120, into which the connector 110 is inserted or disposed, may be moved along a guide groove (for example, the second guide groove 163a). If the wings 123 arranged substantially on opposite sides of the connector holder 120 are inserted into and coupled to the guide grooves and a pressure is applied to the connector 110, the connector holder 120 that fixes the connector 110 may be moved in a direction in which the pressure is applied.

The drawing exemplifies that the positions of the connector 110 and the connector holder 120 are adjusted in a state in which the fixing part 200 is arranged perpendicularly to the connector 100, various embodiments of the present disclosure are not limited thereto. For example, an operation of positioning the connector 110 may be performed in a state in which the fixing part 200 is rotated to be arranged in parallel to the connector body 130 (for example, at a location of the upper fixed plate 211 of the fixing part 200 that is distant from the connector 110).

Figure 13:
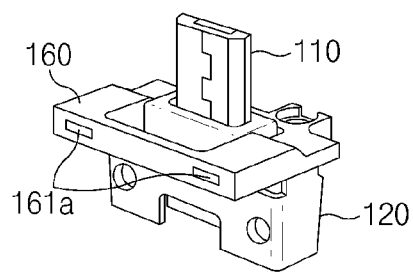
FIG. 13 is a view illustrating a state in which a connector is moved according to an embodiment of the present disclosure.
Figure 13:
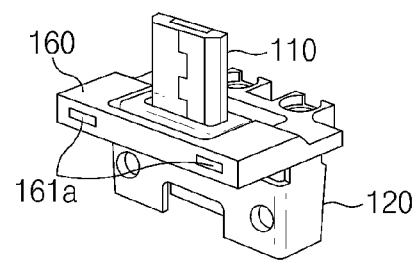

FIG. 13 is a view illustrating a state in which a connector is moved according to an embodiment of the present disclosure.

Referring to FIG. 13, the connector 110 may be moved along the movement hole provided on the inside of the guide body 160. State 1301 represents a state in which the connector 110 is moved towards the hinge in the movement hole of the guide body 160. As illustrated, the guide body 160 may have a rectangular band shape. A hook recess 161*a* for fixing the connector body 130 when the connector body 130 is coupled to the guide body 160 may be arranged on one side of the front surface of the guide body 160. The connector 110 may be inserted into the connector holder 120. Because the connector 110 protrudes to the outside of the movement hole of the guide body 160, the connector 110 and the connector holder 120 may be moved by applying a pressure to the connector 110.

Meanwhile, when a force is applied to the connector 110 in one direction (for example, towards the front surface of the connector body 130) or a resilient force is applied to the connector holder 120 according to arrangement of the resilient member, the connector 110 may be arranged closer to the front surface of the connector body 130 as in state 1303. The difference between the positions of the connector 100 in states 1301 and 1303 may be a predetermined distance (for example, around 4 mm). However, various embodiments of the present disclosure are not limited to the predetermined distance. For example, when the size of at least one of the guide body 160 and the connector body 130 becomes larger, the movement interval of the connector 110 may also become larger. In contrast, when the size of at least one of the guide body 160 and the connector body 130 becomes smaller, the movement interval of the connector 110 may become smaller.

Figure 14:
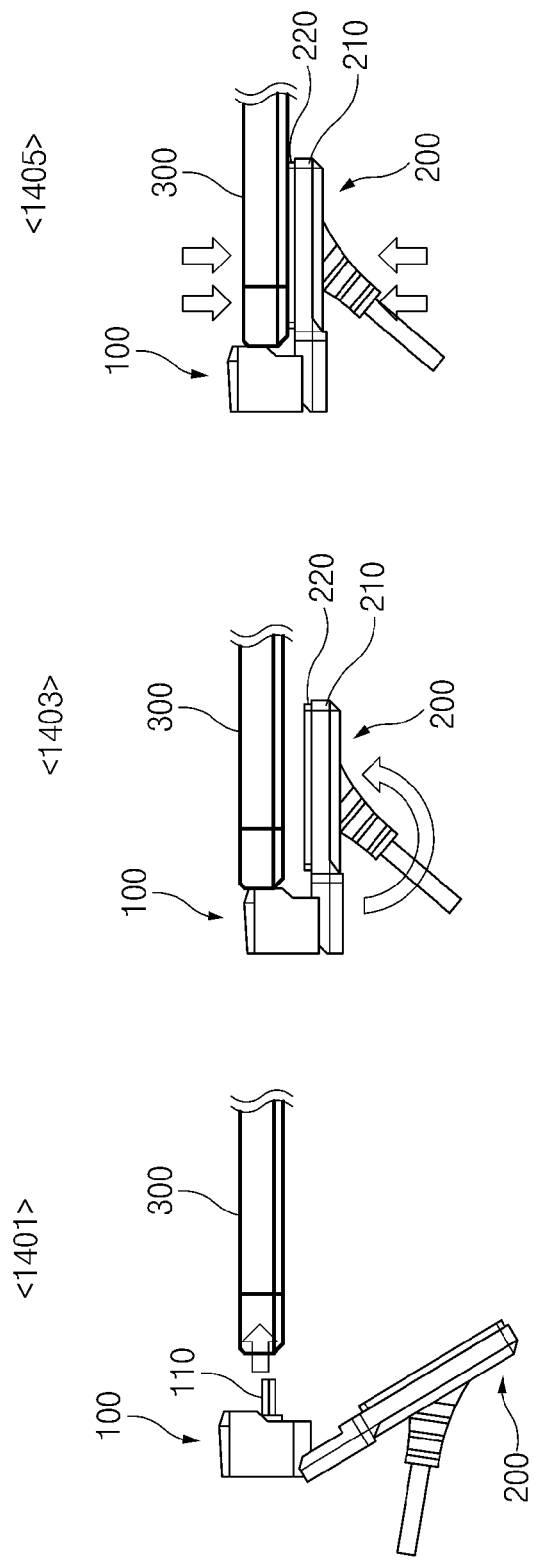
FIG. 14 is a view illustrating a method of installing an electronic device according to an embodiment of the present disclosure.

FIG. 14 is a view illustrating a method of installing an electronic device according to an embodiment of the present disclosure.

Referring to FIG. 14, as in state 1401, the connector module 10 may be arranged such that the interval between the connector part 100 and the fixing part 200 is an obtuse angle (for example, not less than 90 degrees with reference to a state in which the connector 110 is positioned transversely). In this regard, while the connector part 100 is fixed, the fixing part 200 may be rotated in response to a pressure applied in a direction in which the fixing part 200 is moved away from the connector 110.

The electronic device 300 may be mounted on the connector 110 that is arranged in the connector part 100 as in state 1403. For example, a port of the electronic device 200 may be mounted on the connector 110. The port of the electronic device 300 may include terminals having a depth corresponding to the connector 110. If the electronic device 300 is inserted into the connector 110, the connector 110 may transmit the corresponding electrical connection to the connector PCB 115 and the connector PCB 115 may transmit the electrical connection to the control unit of the locking device through the cable. If the electronic device 300 is inserted into the connector 110, the control unit may perform communication in a designated fashion to collect information on the holding stage of the electronic device 300.

When the connector 110 is arranged closer to the front side wall of the connector body 130 while the electronic device 300 is inserted into the connector 110, a clearance may be generated between the electronic device 300 and the fixing part 200 as in state 1403. Accordingly, the bonding part 220 arranged in the fixing part 200 may be in a non-contact state with the electronic device 300. When the fixing panel 210 is fixed while a pressure applied from the front surface to the rear surface of the connector body 130 is provided for the electronic device 300, the electronic device 300 inserted into the connector 110 may be moved towards the fixing part 200.

Accordingly, as in state 1405, the electronic device 300 and the bonding part 220 of the fixing part 200 may contact each other such that the bonding part 220 may fix the electronic device 300 while making contact with one side of the bottom surface of the electronic device 300. When the bonding part 220 makes contact with the bottom surface of the electronic device 300, the sensor needle 231 of the sensor part 230 may make contact with one side of the bottom surface of the electronic device 300. Accordingly, the position of the sensor needle 231 of the sensor part 230 may be changed, and the sensor part 230 may generate a sensor signal to transmit the sensor signal to the control unit through the cable 240. Accordingly, the control unit may identify that the electronic device 300 is inserted into the connector 110 and is mounted on the bonding part 220.

Figure 15:
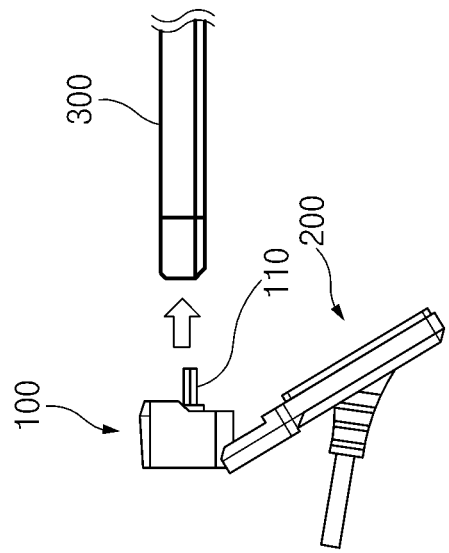
FIG. 15 is a view illustrating a method of separating an electronic device according to an embodiment of the present disclosure.
Figure 15:
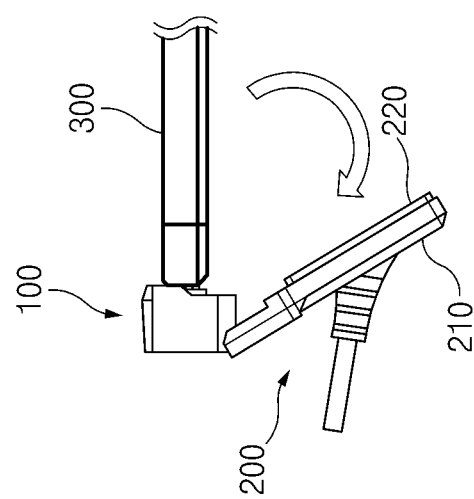

FIG. 15 is a view illustrating a method of separating an electronic device according to an embodiment of the present disclosure.

Referring to FIG. 15, as described above in state of FIG. 14, the electronic device 300 may be both in a state in which the electronic device 300 is inserted into the connector 110 and a state in which the electronic device 300 is inserted into the bonding part 220 of the fixing part 200. For stable separation of the electronic device 300, a pressure may be applied in a direction in which the fixing part 200 is spaced apart from the electronic device 300 while the connector part 100 is gripped (or while a periphery of the electronic device 300 is gripped). Accordingly, the bonding part 220 attached to the electronic device 300 may be separated as shown in state 1501. The separated fixing part 200 may be switched into state 1403 which has been described above in response to the hinge operation with the connector part 100.

After the fixing part 200 is spaced apart from the rear surface of the electronic device 300, the electronic device 300 may be separated from the connector 110 as in state 1503. After the connector part 100 is fixed in the operation, a pressure may be applied in a direction in which the electronic device 300 is detached from the connector part 100 by gripping the electronic device 300. When the resilient member is arranged such that a resilient force is applied to the connector 110 (for example, when a resilient force is shown such that the connector 110 is moved towards the rear side wall of the connector body 130), the position of the connector 110 may be moved towards the rear side wall of the connector body 130.

Figure 16:
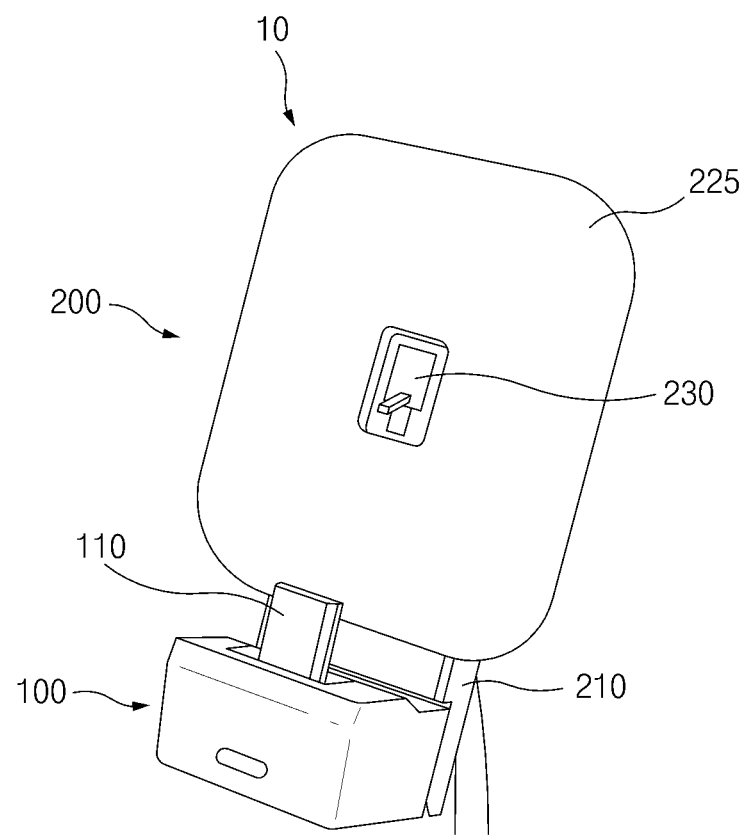
FIG. 16 is a view illustrating another example of a connector module according to various embodiments of the present disclosure.

FIG. 16 is a view illustrating another example of a connector module according to various embodiments of the present disclosure.

Referring to FIG. 16, the connector module 10 may include a connector part 100 and a fixing part 200. The connector part 100 may have a shape and a material that are substantially the same as those of the above-described connector part 100. The fixing part 200 may include, for example, a deformable bonding part 225. The deformable bonding part 225 may be arranged in a fixing panel 210 to replace the above-described bonding part 220. Alternatively, the deformable bonding part 225 may be arranged to be additionally stacked on the above-described bonding part 220.

The deformable bonding part 225 may have a width that is wider than the width of the fixing panel 210. The deformable bonding part 225 may be provided, for example, in the form of a square sheet having a predetermined thickness, and corners of the deformable bonding part 225 may be rounded. According to various embodiments of the present disclosure, the deformable bonding part 225 may include a plastic panel of a predetermined thickness having a sensor hole at the center thereof, and bonding layers arranged on the front and rear surfaces of the plastic panel. The sensor hole functions to expose a sensor part 230 arranged in the fixing panel 210. A bonding layer may be formed (or a bonding material may be applied) in the entire area of the front surface (for example, one surface on a side on which the connector 110 is arranged) of the plastic panel except for the sensor hole. A bonding layer may be formed (or a bonding material is applied) only in an area of the rear surface (for example, one surface on a side on which the fixing panel 210 is arranged) corresponding to the fixing panel 210.

According to various embodiments of the present disclosure, the deformable bonding part 225 may include a plastic panel having a sensor hole at the center thereof, bonding layers arranged on the entire front and rear surfaces of the plastic panel, and protective films arranged on the front and rear surfaces of the plastic panel. The protective films arranged on the front surface of the plastic panel are arranged to cover, for example, an entire plastic panel area except for the sensor hole or including the sensor hole area, and may be provided to have one continuous film. The protective films arranged on the rear surface of the plastic panel may be provided, for example, by cutting a first area that will be attached to the fixing panel 210 and a second area that will be attached to an area except for the fixing panel 210. Accordingly, when the deformable bonding part 225 is bonded onto the fixing panel 210 (or bonded onto the bonding part 220), it may be attached onto the fixing panel 210 (or the bonding part 220) while only the first area corresponding to the fixing panel 210 is removed and the second area is maintained.

Various embodiments of the present disclosure may provide a connector module including: a connector body at least a portion of the interior of which formed an empty area; and a connector part arranged on one side of the connector body, wherein the connector part includes: a connector protruding from the connector body; and a connector holder seated in the empty area of the connector body and configured to fix the connector, and wherein the connector holder is arranged to move the connector in one direction in response to an external pressure.

The connector module according to an embodiment of the present disclosure may include a connector part including a connector protruding from a connector body having an empty space in the interior thereof and connected to a designated port of an electronic device and a connector holder arranged such that the connector is moved in one direction, and a fixing part connected to one side of the connector body in a hinged fashion, being rotatable away from the connector or closer to the connector, and on which a bonding part is arranged in a direction in which the connector is arranged according to a rotational state thereof.

The connector module according to an embodiment of the present disclosure may include a connector part including a connector body having an empty space in the interior thereof, a connector protruding from the connector body and connected to a designated port of an electronic device, and a connector holder seated on the connector body, configured to fix the connector, and arranged such that the connector is moved in one direction by an external pressure.

According to various embodiments of the present disclosure, the connector module may further include a fixing part connected to one side of the connector body in a hinged fashion and being rotatable away from the connector or closer to the connector.

According to various embodiments of the present disclosure, the fixing part may include: a fixing panel to which a cable is connected; and a bonding part arranged on one surface of the fixing panel and arranged closer to the connector as the fixing part is rotated.

According to various embodiments of the present disclosure, a width of the bonding part may be larger than a width of an upper fixing plate.

According to various embodiments of the present disclosure, the connector module may further include a deformable bonding part in which a boding layer is arranged at least one of opposite surfaces thereof and one surface of which is bonded to the bonding part.

According to various embodiments of the present disclosure, the fixing panel may include a lower fixing plate connected to one side of the connector body in a hinged fashion; an upper fixing plate that covers at least a portion of an upper surface of the lower fixing plate; and a coupling member that fixes the upper fixing plate to the lower fixing plate.

According to various embodiments of the present disclosure, the lower fixing plate may include a connection hole formed on one side of the cable and configured to fix movement of the cable and a stopper holder that fixes an end of a molding stopper inserted into the connection hole.

According to various embodiments of the present disclosure, the lower fixing plate may include a cable cover that guides the cable such that the cable is inserted at a predetermined angle or an insertion state of the cable is maintained.

According to various embodiments of the present disclosure, the fixing part may further include a sensor part arranged on one side of the fixing panel and configured to sense a physical contact (or generate a designated sensor signal according to a contract of an object).

According to various embodiments of the present disclosure, the fixing part may further include a sensor pad inserted into a bracket arranged on one side of the fixing panel and configured to support the sensor part.

According to various embodiments of the present disclosure, the fixing panel and the bonding part may include holes through which the sensor part is exposed to the outside.

According to various embodiments of the present disclosure, the connector module may further include a cable connected to one side of the fixing part and some wires of which are arranged inside the connector body.

According to various embodiments of the present disclosure, the connector part may further include a bottom; and a guide body arranged to cover at least a portion of an opening of the connector body including side walls extending from peripheries of the bottom by a predetermined height and from which the connector protrudes, and the connector holder may guide the connector such that the connector is moved in a designated direction (in any one of forward and rearward directions) along a guide groove formed in the guide body.

According to various embodiments of the present disclosure, he connector part further may include a connector printed circuit board (PCB) electrically connected to the connector. a light emitting diode (LED) arranged on one side of the connector PCB and configured to irradiate light according to supplied electric power, a through-hole formed on one side of the connector body, and an LED window seated in the through-hole and configured to irradiate light from the LED to the outside of the connector body.

According to various embodiments of the present disclosure, the connector body may include a front side wall, left and right side walls connected to the top side wall and a rear side wall connecting the left and right side walls, and a height of the left and right side walls closer to the front side wall may be larger than a height of the left and right side walls closer to the rear side wall.

According to various embodiments of the present disclosure, the connector part may further include at least one resilient member arranged between the connector body and the connector holder and having a resilient force such that the connector holder returns a designated position after being moved.

According to various embodiments of the present disclosure, the connector part may further include a connector pad arranged closer to the connector holder and arranged to absorb an impact occurring due to a collision with the connector body.

Figure 17:
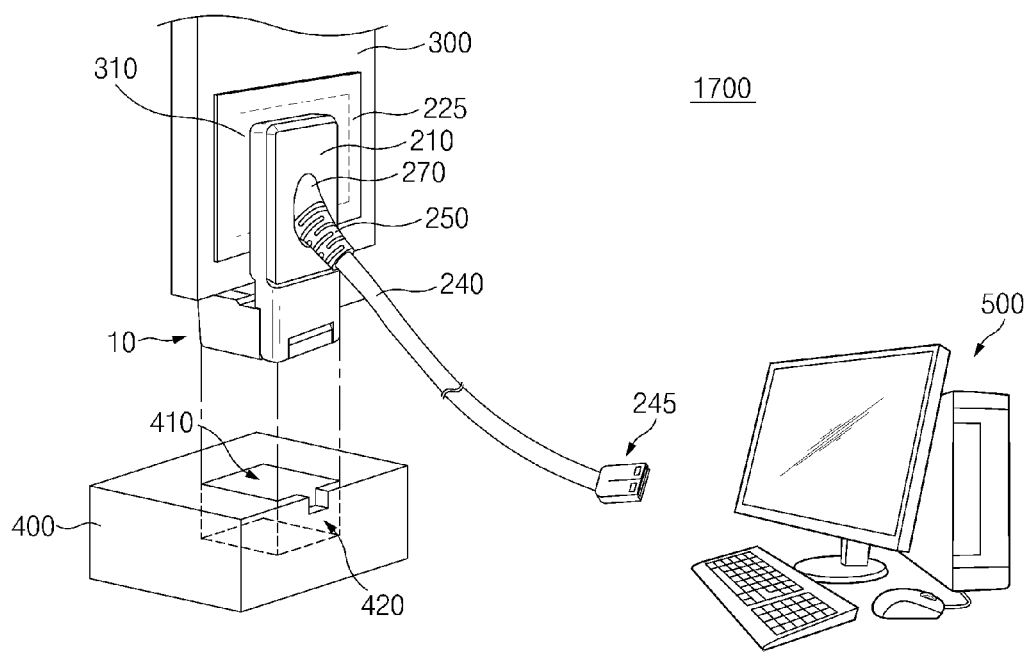
FIG. 17 is a view illustrating an example of a locking device according to an embodiment of the present disclosure.

FIG. 17 is a view illustrating an example of a locking device according to an embodiment of the present disclosure.

Referring to FIG. 17, the locking device 1700 according to the present disclosure may include, for example, a connector module 10, a cradle 400, and a control unit 500, and an electronic device 300 that is locked by the locking device 1700 may be arranged.

The connector module 10 may include, for example, a connector part 100 and a fixing part 200 that have been described above. A port (for example, a power charging terminal) of the electronic device 300 may be coupled to the connector part 100. According to various embodiment of the present disclosure, the connector 100 may be excluded from the connector module 10. In this case, the connector part may be operated for the purpose of holding the electronic device 300. Additionally, or alternatively, a wireless charging unit that may perform wireless charging may be provided in the fixing part 200. For example, a deformable bonding part 225 may be electrically connected to a cable 240, and a coil that may transfer electrical energy wirelessly may be arranged in the deformable bonding part 225. Alternatively, a module that may transfer electrical energy wirelessly may be provided inside the fixing panel 210. The electronic device 300 may include a wireless charging unit 310. The wireless charging unit 310 may be arranged on one side (a lower portion of the rear surface of the electronic device 300) of a lower portion of the electronic device 300. Accordingly, the wireless charging unit 310 may be arranged to face a wireless energy transfer module of the fixing part 200 while the electronic device 300 is mounted on the fixing part 200.

One end of the cable 240 of the connector module 10 may have, for example, the shape of a USB connector 110. The above-described USB connector 110 may have various forms, for example, a shape of a micro USB, a shape of a UART, a shape of a jack according to a change of design. The USB connector 110 may be electrically connected to the control unit 500, and may transmit and receive signals related to the electronic device 300 mounted on or detached from the connector module 10.

The cradle 400 may include a seating part on which the connector module 10 may be seated as illustrated. The seating part may include a seating recess 410 in which portions of the connector body 130 and the fixing part 200 of the connector module 10 are seated, and a cable groove 420 in which the cable 240 may be seated. The cradle 400 may be formed, for example, of a transparent material. Accordingly, the cradle 400 allows the user to identify light from the outside when the light is generated by an LED window 140 arranged in the connector body 130. The cradle 400 may be formed of a material having not less than a predetermined weight to stably support the electronic device 300 after the connector module 10, on which the electronic device 300 is mounted, is seated on the cradle 400. According to an embodiment of the present disclosure, the cradle may be formed of crystal, transparent acryl, plastic, or the like. When the cable of the connector module 10 is connected to a front side wall of the connector body 130, the cable groove 420 of the cradle 400 may be arranged in an opposite direction to the currently illustrated direction.

The control unit 500 may be electrically connected to the connector module 10 through the USB connector 110 of the cable 240. The control unit 500 may identify whether the electronic device 300 is in contact with the connector 110 or the sensor part 230 by transmitting a signal to the connector 110 and the sensor part 230 at a predetermined period or in real time or by providing the connector 110 and the sensor part 230 with a pull-up voltage.

When the electronic device 300 is in contact with the connector 110 or the sensor part 230, the control unit 500 may output (for example, through at least one of a display and an audio unit) an alarm. According to an embodiment of the present disclosure, when the electronic device 300 is connected to the connector 110, the control unit 500 may perform a control to supply electric power. Furthermore, if the electronic device 300 is connected to the connector 110, the control unit 500 may perform communication to collect device information of the electronic device 300, and may output the device information on a display included in the control unit 500. According to various embodiments of the present disclosure, if the electronic device 300 is inserted into the connector 110, the control unit 500 may perform a control to activate the sensor part 230 by supplying electric power to the sensor part 230. If receiving a designated sensor signal from the sensor part 230, the control unit 500 may determine that the electronic device 300 is in contact with the fixing part 200.

When the electronic device 300 is detached from at least one of the connector 110 and the sensor part 230, the control unit 500 may output an alarm corresponding to that state or condition. According to an embodiment of the present disclosure, if not receiving a designated sensor signal from the sensor part 230 in response to the separation of the electronic device 300 from the fixing part 200, the control unit 500 may perform a control to output guide information (for example, at least one of a designated guide sound, a guide pattern, and display information) corresponding to the separation of the electronic device 300 from the fixing part 200. Furthermore, when the electronic device 300 is separated from the connector 110, the control unit 500 may output guide information corresponding to the separation of the electronic device 300 from the connector 110.

According to various embodiments of the present disclosure, if a signal corresponding to the separation of the electronic device 300 from the connector 110 is detected in a state in which a designated sensor signal is supplied from the sensor part 230, the control unit 500 may output guide information on the damage to the connector module 10. As described above, the control unit 500 may determine whether the electronic device 300 is held, based on at least one of the connector 110 and the sensor part 230 (e.g., information received by the sensor part 230). Furthermore, the control unit 500 may determine information on the holding state of the electronic device 300 based on at least one of the connector 110 and the sensor part 230, and may output guide information corresponding to the fact. As described above, the connector module 10 according to an embodiment of the present disclosure may identify the mounting and detachment of the electronic device 300 based on at least one of the connector 110 and the sensor part 230 electrically connected to the electronic device 300.

As described above, a locking device according to an embodiment of the present disclosure may include a connector part including a connector protruding from a connector body having an empty space in at least an area of the interior thereof and being connected to a designated port of an electronic device, and a connector holder arranged such that the connector is movable in one direction; and a fixing part connected to one side of the connector body in a hinged fashion, being rotatable away from or closer to the connector, and in which a bonding part is arranged to be closer to the connector when in a particular rotation state.

According to various embodiments of the present disclosure, the locking device may include a control unit to which the connector module is electrically connected, and the control unit may determine a contact state of the fixing part based on a sensor part for sensing a contract state of the fixing part and outputs guide information corresponding to a holding state of the electronic device.

According to various embodiments of the present disclosure, the electronic device is separated from the connector part or separated from the contact state of the fixing part, the control unit may output guide information corresponding to the separation.

According to various embodiments of the present disclosure, coupling and separation of an electronic device and a connector module can be easily performed.

Furthermore, the present disclosure can provide a firmer bonding force between an electronic device and a connector module and can provide an alarm when the electronic device is separated.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A connector module, comprising:
 a connector body including an interior space having an empty area therein; and
 a connector part disposed on one side of the connector body, the connector part including:
  a connector protruding from the connector body; and
  a connector holder seated in the empty area of the connector body and configured to secure the connector thereto,
 a fixing part is connected to one side of the connector body in a hinged fashion;
 wherein the fixing part is separately disposed with the connector and is configured to move toward the connector or away from the connector in response to an external force;
 wherein the connector is configured to move in a direction of a front side of the connector body or a rear side of the connector body.

2. The connector module of claim 1, wherein the fixing part is rotatable relative to the connector.

3. The connector module of claim 2, wherein the fixing part comprises:
 a fixing panel to which a cable is configured to be connected; and
 a bonding part disposed on one surface of the fixing panel and configured to move closer to the connector in response to the fixing part being rotated.

4. The connector module of claim 3, wherein the fixing part further comprises an upper fixing plate, and wherein a width of the bonding part is larger than a width of the upper fixing plate.

5. The connector module of claim 3, further comprising:
 a deformable bonding part including a bonding layer that is disposed on at least one of opposite surfaces thereof, wherein the bonding layer is bonded to the bonding part.

6. The connector module of claim 3, wherein the fixing panel comprises:
 a lower fixing plate rotatably connected to one side of the connector body, the lower fixing plate including an upper surface;
 an upper fixing plate that covers at least a portion of the upper surface of the lower fixing plate; and
 a coupling member that secures the upper fixing plate to the lower fixing plate.

7. The connector module of claim 6, wherein the lower fixing plate comprises:
 a connection hole formed on one side of the cable and configured to inhibit movement of the cable; and
 a stopper holder that fixes an end of a molding stopper disposed within the connection hole.

8. The connector module of claim 6, wherein the lower fixing plate comprises:
 a cable cover that guides the cable such that the cable is configured to be inserted at a predetermined angle and an insertion state of the cable is maintained.

9. The connector module of claim 3, wherein the fixing part further comprises:
 a sensor part disposed on one side of the fixing panel, wherein the sensor part is configured to sense a physical contact.

10. The connector module of claim 9, wherein the fixing part further comprises:
 a sensor pad inserted into a bracket disposed on one side of the fixing panel, the sensor pad being configured to support the sensor part.

11. The connector module of claim 9, wherein the fixing panel and the bonding part comprise holes through which the sensor part is exposed to the outside.

12. The connector module of claim 1, further comprising:
 a cable connected to one side of a fixing part and at least one wire that is disposed inside the connector body.

13. The connector module of claim 1, wherein the connector part further comprises:
 a bottom; and
 a guide body disposed to cover at least a portion of an opening of the connector body comprising side walls extending from peripheries of the bottom by a predetermined height and from which the connector protrudes, and wherein the connector holder guides the connector such that the connector is moved in a predetermined direction along a guide groove formed in the guide body.

14. The connector module of claim 1, wherein the connector part further comprises:
   a connector printed circuit board (PCB) electrically connected to the connector;
   a light emitting diode (LED) disposed on one side of the connector PCB and configured to irradiate light according to supplied electric power;
   a through-hole formed on one side of the connector body; and
   an LED window seated in the through-hole and configured to irradiate light from the LED to the outside of the connector body.

15. The connector module of claim 1, wherein the connector body comprises:
   a front side wall;
   left and right side walls connected to the front side wall; and
   a rear side wall connecting the left and right side walls,
   wherein a height of the left and right side walls closer to the front side wall is larger than a height of the left and right side walls closer to the rear side wall.

16. The connector module of claim 1, wherein the connector part further comprises:
   at least one resilient member disposed between the connector body and the connector holder and having a resilient force such that the connector holder returns to a predetermined position after being moved.

17. The connector module of claim 1, wherein the connector part further comprises:
   a connector pad disposed closer to the connector holder and disposed to absorb an impact resulting from a collision with the connector body.

18. A locking device, comprising:
   a connector part comprising:
      a connector holder; and
      a connector body;
   a connector protruding from the connector body,
   the connector part including an interior space having an empty area therein and being connected to a designated port of an electronic device by the connector holder,
   the connector holder permitting the connector to be movable in one direction;
   a fixing part including a fixing panel, the fixing part being rotatably connected to one side of the connector body; and
   a bonding part disposed on a surface of the fixing panel and being configured to move closer to the connector in response to the fixing part being rotated.

19. The locking device of claim 18, further comprising:
   a control unit to which a connector module is electrically connected,
   wherein the control unit determines a contact state of the fixing part based on a sensor part for sensing a contract state of the fixing part and outputs guide information corresponding to a holding state of the electronic device.

20. The locking device of claim 19, wherein when the electronic device is at least one of separated from the connector part and separated from the contact state of the fixing part, the control unit outputs guide information corresponding to the separation.

* * * * *